Jan. 27, 1942.                R. E. SNYDER                2,271,502
                        DUCTILE TUBING CONNECTOR
                         Filed May 8, 1940
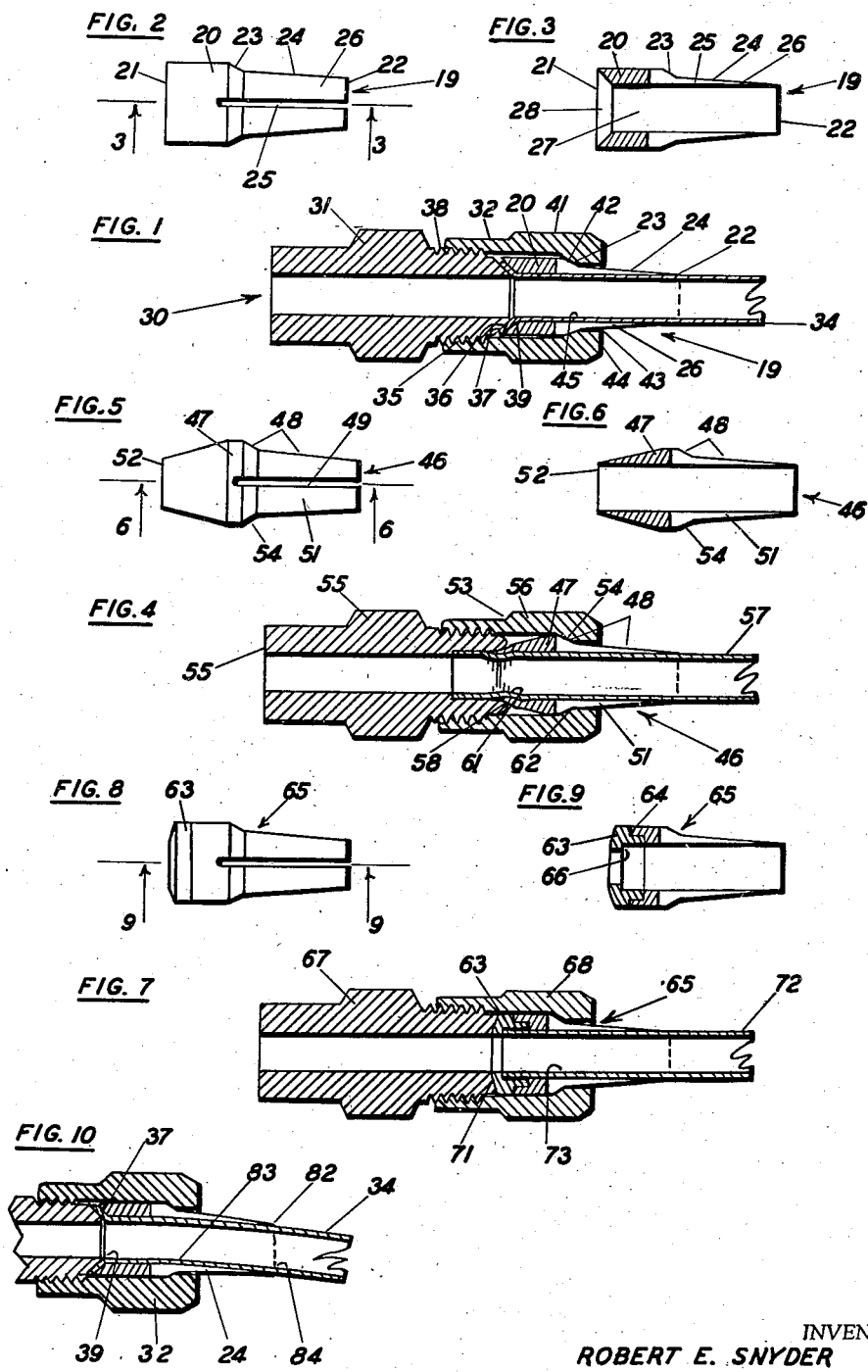
INVENTOR.
ROBERT E. SNYDER
BY
ATTORNEY.

UNITED STATES PATENT OFFICE 2,271,502

DUCTILE TUBING CONNECTOR

Robert E. Snyder, Pasadena, Calif., assignor to Snyder Research, Inc., a corporation of California Application May 8, 1940, Serial No. 333,985

8 Claims. (Cl. 285—86)

This invention relates to pipe joints or couplings, and more particularly to couplings of the type used to interconnect flexible or yielding pipe through the expedient of a thimble or ferrule freely revoluble upon one of the tubes to be interconnected and adapted to be engaged upon the other by means of screw threads formed on the thimble and thus join the two tubes in a leak-proof connection having sufficient strength to meet commercial requirements.

It is readily apparent that when couplings of the type indicated are used to interconnect sections of tubing, the cross-sectional area of the couplings will be relatively great compared with that of the tubing they serve to interconnect. Furthermore, the connectors being of greater diameter than the tubing on which they are mounted, they are materially stiffer than the tubing. As a result, whenever such a line of tubing is subjected to continued vibration or flexure, or both, very characteristic points of failure develop in the tubing. In general, these failures occur very close to the juncture of the tubing and the coupling; the exact point of failure depending upon the type of connector used, the type and physical uniformity of the tubing, the vibrational frequency and amplitude, the damping means used, the unsupported length of tube, and other variables. In the greater number of examples, the failure occurs less than one diameter of the enclosed tube away from the coupling or last point of support of the tubing by the coupling.

Scientifically, the explanation may be made in terms of stiffness. "Stiffness," according to one authority, is defined as "the resistance to deformation under stress," or "the restoring force per unit displacement," wherein the deformation is presumed not to exceed the elastic limit of the material under consideration, (Eshbach). Thus in a train of directly connected members of differing individual stiffnesses, the "resistance to deformation" or the "restoring force per unit displacement" will vary from member to member. The general rule seems to hold that under vibrational or cyclical stresses, stress concentrations will be produced in the train at all junctures of members of differing stiffnesses.

In a tube subjected to repeated flexure, either cyclical or otherwise, each unit particle of the material of which the tube is composed, is subjected alternately to tension and compression stresses, this action being most pronounced near the outer surface of the tube. The particles are, therefore, alternately pulled apart and pressed toward each other, and, as such action continues, they become displaced with reference to each other within the structure of the material, and gradually produce a surface "wavyness" on the tube. These waves usually appear on circumferential arcs about the tube, and continued flexure tends to deepen the wave troughs until fissures occur at the bottom of the troughs, which fissures gradually increase in length and width, ultimately uniting with other fissures, and a circumferential plane of weakness begins to develop. The resultant decrease in stiffness of the tubing along this plane causes a corresponding increase in the stress concentration in the weak portion and further hastens the action. When the fissure finally works clear through the tube, the process of progressive failure is complete. Any local corrosion may itself be the cause of a fissure or may aid in deepening a fissure as the oxide products created in the fissure act as a wedge to deepen it still further under continued flexure.

As an example, when a brass coupling is attached to a ductile copper tube in accordance with conventional practice, a construction is presented wherein a length of tubing consists of portions immediately adjacent each other and of different cross sectional area and hence possessing different degrees of stiffness, the portion having the lesser cross sectional area usually being the more flexible of the two. It is well known, however, that whenever a member of such a character is subjected to repeated flexure, a concentration of stress will be imposed upon the portion of lesser stiffness, immediately adjacent the point of its last support by the stiffer of the two portions. This accounts for the well recognized fact that the point of most probable failure of a conventional ductile copper tube, such as those regularly employed as oil lines, fuel lines, and compressed air conductors in many different types of mechanical installations, is in the tubing portion of such a line immediately adjacent any of the coupling thimbles.

An object of the present invention, therefore, is the provision of a novel type of coupling means for ductile tubing in which means are provided for avoiding concentration of stress in the more flexible of the two members which otherwise would be present when such a conductor is subjected to repeat flexure.

A more detailed object in this connection is to avoid the concentration of stress referred to by providing means for distributing stress which inevitably occurs when flexure of the tubing occurs. Inasmuch as it is out of the question to prevent the development of such stress, my present invention seeks to make the stress innocuous in so far as damage to the tubing is concerned, and this can best be accomplished by effecting the distribution of the stress over a material length of the tubing, and thus avoid the concentration of stress at a single point which heretofore has been the direct cause of failure in ductile copper tubing subjected to repeated flexure.

A further object of the present invention is to assure the distribution of stress referred to by means of a yielding resilient support for the more flexible of the two portions of the conductor, preferably carried by the stiffer of the two and extending therefrom in continuous contact with the more flexible member in such a manner as to attain the results desired. Other manners of approaching the problem and providing the distribution of stress by means of different types of support for the less stiff member, form the subject matter of my co-pending application, Serial No. 326,699, filed March 29, 1940.

Another object of my invention is to provide means resiliently supporting the more flexible of the two portions of the conductor, which means are carried by the stiffer member and engage the more flexible member in a sliding engagement, thereby enhancing the degree of flexibility of the assembled unit.

Another object of my invention is the provision of stress-distributing means for use in conjunction with the coupling for ductile metal tubing in the manner indicated, which interferes in no manner whatsoever with the efficiency of the coupling member as such, does not add materially to its cost of manufacture, and does not complicate or make more difficult the installation and/or servicing of the coupling member.

A further object is the provision of means for avoiding concentration of stress in a ductile metal tubing adjacent the couplings used in connection with that tubing, which does not detract materially from the flexibility of the tubing considered as a whole.

Yet another object of my invention is the provision of means for distributing stress over a material length of tubing adjacent the coupling used in connection with that tubing, which distributing means is constructed entirely of fireproof and heat-resistant material, preferably of the same material as that of which the coupling member is constructed, and adapted to lend itself economically to large-scale production upon a quantity basis by automatic machinery.

A more specific object of the present invention is the provision of means for avoiding concentration of stress in ductile metal tubing adjacent the coupling or couplings used in connection with that tubing which means takes the form of a sleeve anchored rigidly at or adjacent one end to the body of the coupling and having resiliently flexible fingers extending therefrom along the tubing in supporting contact therewith, these fingers in addition to being flexible and resilient being of gradually diminishing cross sectional area as the distance from the body of the coupling increases, with the result that the support that they offer the tubing gradually diminishes to a negligible value adjacent their outer ends.

A still further object to the present invention is the provision of an improved and simplified sleeve wherein the fingers are caused to press against the tubing by being deflected inwards by engagement with the outer faces of the fingers of a portion of the nut or ferrule member of the coupling when the nut is tightened. This is in contrast to the manner of operation of the sleeve member of my said copending application Serial No. 326,699, which is not deformed when the nut is tightened but the resilient fingers of which are caused to press against the tube because of the configuration imparted thereto at the time of the sleeve's manufacture.

Referring to the drawing:

Figure 1 is a longitudinal, medial sectional view of a coupling member embodying the principles of the present invention in operative relation to a tube connected thereto.

Figure 2 is a view in side elevation of the stress distributing sleeve of Figure 1.

Figure 3 is a longitudinal medial sectional view of the sleeve of the Figures 1 and 2 taken on the line 3—3 of Figure 2.

Figure 4 is a view similar to Figure 1 showing a modified form of sleeve.

Figure 5 is a view in side elevation of the sleeve in Figure 4.

Figure 6 is a longitudinal, medial sectional view of the sleeve of the Figures 4 and 5 taken on the line 6—6 of Figure 5.

Figure 7 is another view similar to Figure 1 of a further modified form of sleeve.

Figure 8 is a view in side elevation of the sleeve of Figure 7.

Figure 9 is a longitudinal, medial sectional view of the sleeve of Figures 7 and 8, taken on the line 9—9 of Figure 8.

Figure 10 is a fragmentary view similar to Figure 1 but showing the tubing flexed to illustrate the manner in which the resilient fingers of the sleeve cooperate therewith to perform their stress-distributing function.

Referring to the accompanying drawing, wherein similar reference characters designate similar parts throughout, I have illustrated the manner of application of my present invention to three well known types of couplings; the flared type, Figures 1–3 inclusive and 10; the compression type, Figures 4–6 inclusive; and the soldered or "union" type, Figures 7–9 inclusive. These three types are most common to the industry but the invention may be adapted to many other types of couplings. In general the flexible support means for the tube is comprised of a sleeve form in which the flexible supporting portion is essentially the same for all types of couplings.

The sleeve 19 of Figures 1, 2, 3 and 10 is illustrative. It consists of a tubular body 20 which is of constant diameter from adjacent its center to its inward end 21. From the body 20 toward its outward end 22 the sleeve is formed with two tapers. The first taper 23 is relatively short and steep, whereas the second taper 24 from the end of the taper 23 to the outer end 22 of the sleeve is relatively long and gradual. As an example, the taper 23 may be substantially 25 degrees, and taper 24 five degrees. The taper 23 serves as a shoulder against which a nut can be seated as will be more fully described hereinbelow.

The sleeve 19 is formed with a plurality of slots 25 which extend longitudinally of the sleeve from its outer end 22 toward and for a material distance into the body portion 20 thereby presenting a plurality of tapered fingers 26. These fingers being possessed of a certain inherent flexibility, they can be flexed inwards to establish supporting contact with tubing disposed therebetween, whereas the body portion, being solid (i. e., not slotted), is relatively rigid and therefore affords unyielding support for the inner ends of the fingers 26. Moreover, in addition to being flexible the material of which the sleeve 19 is composed also possesses a certain degree of inherent resilience or stiffness so as to enable the fingers 26 to offer the desired elastic support to the tubing. The sleeve 19 is formed with an axial bore 27 extending completely therethrough at constant diameter except at its extreme inner end where it enlarges to provide a tapered seat 28. Whereas the fact that the fingers 26 are brought into cooperative relation with the tubing by being flexed thereagainst reduces the need for accuracy of dimension as far as the diameter of the bore 27 is concerned; nevertheless it is preferable that this diameter should exceed the outside diameter of the tubing upon which it is intended to be mounted only so slightly as to establish a close sliding fit thereupon.

Figure 1 shows the manner of assembly of the sleeve 19 in a conventional coupling 30 for a flared tube. This coupling comprises a base part 31, a nut 32 and the sleeve 19, and is mounted in operative relation upon a tube 34. The base part 31 is illustrated as having a threaded portion 35 and a special tapered seat 36 against which the flared portion 37 of the attached tube 34 may be seated. The nut 32 comprises an internally threaded portion 38 engageable with the externally threaded portion 35 of the base part 31, a wrench-receiving external portion 41, and an internally tapered seat 42 engageable with the sleeve shoulder taper 23. The outer end 44 of the nut 32 has a bore 43 which just clears the tapered portion 24 of the sleeve 19 and allows the nut to contact the sleeve only on the taper 23. The largest inside diameter of the nut 32 between the inward end of threaded portion 38 and the base of the tapered seat 42 is just large enough to clear the outside diameter of the body portion 20 of the sleeve 19 so that the sleeve slips freely into the nut; and the only contact between the nut 32 and the sleeve 19 occurs at the faces 42 and 23.

The flared portion 37 of the tube 34 is held against the seat 36 on the base part 31 by the face 28 on the sleeve 19. Tightening the nut 32 upon the base part 31 does several things simultaneously. Primarily it holds the sleeve against the tube flare and seals the tube to the base part, thereby making the internal passage in the fluid conductor continuous and sealed. Further tightening the nut causes the tapered face 42 of the nut to slip longitudinally against the face 23 upon the sleeve and thereby squeeze the fingers 26 into close circumferential engagement with the enclosed tube 34. This causes the grip of the fingers against the tube to be very positive; and such gripping occurs at a material distance outward from the place of sealing contact 36—37 of the tube flare and the base part. The tube is thus held rigid within the coupling between the base part 31 and the grip of the fingers at 45 against any motion whatsoever. Thus the tubing between these two points will not be subjected to any severe concentration of stress due to vibration regardless of what happens to the tube outside the coupling. The fingers 26 of the sleeve 19 extend through the nut 32 outwardly along the tube 34 and are very gradually tapered. Each of these fingers decreases in thickness at a uniform rate to its outer end or tip which is materially thinner than the wall of the enclosed tube. Thus the stiffness of the tube and sleeve which at the inner end of the taper 24 is substantially that of the coupling, decreases uniformly outward from this point and gradually approaches that of the tubing alone at the feather edge tips 22 of the sleeve. By making the tapered fingers sufficiently long, it is assured that this graduation in stiffness will not be too sudden to achieve the desired result. In general, the length of the fingers should be at least one and one-half times the diameter of the enclosed tube. The maximum allowable length is subject to the physical characteristics of the material composing the tube. In some types of brass sleeves cooperating with a copper tube the preferred length of the outer taper 24 seems to lie between 1½ and 2 times the diameter of the enclosed tube. However, wide variations from these values have been recorded and proved satisfactory.

Figures 4, 5 and 6 show the invention embodied in a sleeve modified form of coupling wherein the tube is sealed by deforming an edge of the sleeve against the tube. This in the trade is called a "compression type" coupling. In this sleeve 46, as in the sleeve 19 previously described, the body portion 47, the outer double tapered portion 48, the slots 49, and the fingers 51 preferably are the same. However, inward from body portion 46 the sleeve is externally tapered to a thin edge 52. The nut 53 cooperates with the sleeve 46 by contacting the tapered shoulder 54 and thus forcing the sleeve 46 axially, driving its thin inner edge 52 into the end of the base part 47 which is provided with a special curved seat 58 into which the thin edge 52 of the sleeve 46 is driven when the nut is tightened. In this manner a wedging action is developed which collapses the thin edge 52 so forcibly against the tube that the tube itself is deformed slightly and thereby effectually locked against displacement from the coupling. However, as this deformation to clamp the tubing into the coupling occurs, the tightening of the nut against the tapered shoulder 54 also presses the fingers 51 into close circumferential engagement with tube 57, thereby holding the tube rigid against any movement between point 62 and the inner end of the tube within the coupling. From point 62 outward only lateral flexure may occur as allowed by the flexibility of the enclosing fingers 51, with the result that no stresses whatsoever due to vibration can concentrate at or near point 61 on the enclosed tube.

Figures 7, 8, and 9 show a third type of sleeve and its manner of incorporation into a coupling wherein the tube is sealed by soldering a ring to its inner end and then clamping this ring securely to the base part of the coupling, thereby forming a "un'on" type connection. As in the previous figures, the characteristics of the body portion, the outer tapered portion, the slots, and the resilient fingers are identical. The essential difference is in the soldered ring 63 which seats against a face 64 on the sleeve 65. The outside diameter of the ring 63 corresponds to that of the sleeve 65. In Figure 9 the inner recess 66 appears in the ring 63 into which a tube may be abutted and "sweat-soldered" thereto. In Figure 7 the complete assembly of the coupling appears with a tube attached. The base part 67 cooperates with the nut 68 and the sleeve 65 to clamp the solder ring 63 against a special seat 71 upon the base part 67 thereby sealing the tube 72 to the base part.

Tightening the nut 68 to the base part 67 not only seals the joint but also closes the fingers of the compressible sleeve 65 around the enclosed tube 72 and prevents any stress due to vibration from being concentrated at any point on the tube inward from the base 73 of the contact of the fingers around the tube. It should be noted that the use of a solderable ring is not obligatory. The tube might be soldered into the base of the sleeve provided the heat used was not great enough adversely to affect the resiliency or other physical characteristics of the sleeve material.

There are any number of methods of fastening the tube into the coupling and the three methods shown here are only three arbitrarily chosen out of those commonly used in industry. It has been found from a great deal of experiment that the weakest point on any juncture of a coupling and a tubing is in the tubing just outside the last point of support of the tube by the coupling. This is due not only to the lack of support but also to the condition of the tube immediately adjacent to this juncture. In Figures 1 and 10 tube 34 has a flared portion 37. The mechanical operation of flaring the tube induces rather severe strains in the material so treated. Cold working metals wherein they are deformed beyond their elastic limits, induces what is known as "strain hardening." If this hardening or stressed condition can be reduced to a negligible factor by annealing, then the situation can be relieved; but some substances are not amenable to such treatment. In other cases, the process of annealing is overlooked or not bothered with, thereby leaving the tube in a pre-stressed condition. Thus there is already established in the tube a local point of weakness between the normal tube and the pre-stressed end as at point 39 in Figures 1 and 10. All types of flaring operations produce this condition. Standard type flared tube couplings make no provision for adequately strengthening this inherent weak point on the tube; similarly with respect to the compression type coupling in Figure 4 (a compression type coupling). Here the tube is swaged inwardly by the deformable ring to form a seal against the base, necessarily a cold-working process which induces internal stresses in the tube which is most apt to be deformed beyond its elastic limit. In this case, in contradistinction to the flared type, no known method of annealing the stressed portion may be used without seriously damaging the deformable ring and hence the seal. Decreasing the diameter of the tube in the deformed portion further induces a concentration of stress by increasing the density of the lines of stress through the deformed part. Thus there is set up a plane of weakness circumferentially of point 61 in Figure 4 where failure is possible. Most commercial types of compression couplings make no positive protection against concentration of stress at this point or to reinforce the weakness created by the circumferential deformation of the tube.

This invention embodying means for establishing a tight circumferential grip upon the tube outside the point of inherent weakness obviates consideration of this point of weakness as a source of failure in the couplings described herein. The vibrational stresses are distributed by the flexible sleeve outside the point of weakness of the tube and thus never are allowed to concentrate where they would quickly do harm. In test runs no difference in life of any of the three types was noted when the vibration resistant sleeve was used to protect this point, whereas without this sleeve the difference in the three types was very great. When using the sleeve the life of the unit under vibration is related to the characteristics of the unstressed tube and not influenced by the pre-stressing of a certain local portion of that tube.

The manner in which the flexible, resilient fingers operate to prevent stress-concentration can best be understood by reference to Figure 10, which shows the coupling, sleeve and tube of Figure 1, but with this tube flexed so as to bring the resilient fingers 24 into operation.

The fingers 24 are flexed out to the tips 82 of said fingers. The tube 34 starts to flex from point 83 which is substantially opposite the base of the flexible portion of the sleeve just outside the last point of support of the sleeve by the nut 32. It should be noted that the flexible fingers are not integral with the tube nor soldered nor in any other way fastened to it but are solely held in tight circumferential engagement therewith by resilient pressure. As a result flexure of the tube not only causes the sleeve to flex but also allows the sleeve tips to slip against the tube in true spring leaf fashion. Thus the flexible fingers make slidable engagement with the enclosed tube. This slidable engagement makes for much more flexible support of the tube than if the sleeve were rigidly attached thereto. This slidable, spring leaf action offers gradual support to the enclosed tube decreasing uniformly from the point 83 outwardly to the tips 82 of the sleeve. This flexible support varies the stiffness of the conductor from the maximum value at point 83 to the minimum value just outside point 84 adjacent the finger tips 82. At point 84 the support of the leaves must have dropped to a negligible value as compared to the inherent stiffness of the enclosed tube. These resilient fingers or spring leaves also control the radius of flexure of the enclosed tube and by carefully regulating the strength of these leaves per unit cross section from the point 83 to the tips 82, this radius of flexure can be kept great enough to prevent any concentration of stress in the tube due to flexure and/or vibration.

From the above described constructions it will be appreciated that the improved coupling is primarily designed to be used on tubings that are subjected to a great deal of vibration and that they offer adequate protection against progressive failure of the tube in any specific locality due to sudden change in the stiffness along the fluid conductor as a whole. The invention lends itself to use under a wide variety of different types of constructions which may be preferred or required by standards of practice.

I claim:

1. A coupling for a flexible metal tube which is subjected to vibration, comprising: a tubular body member to which the end of the tubing is attached, a split sleeve having a resilient, externally tapered portion extending from said body member and gripping said tube, and means for contracting the sleeve about the tubing and for rigidly securing it to the body member; said resilient portion of said sleeve extending along said tube externally of said contracting means and being of a length substantially one and one half or more times the external diameter of the tubing and having a thin outer edge of a thickness materially less than the tubing thickness, so that the thin edge of the sleeve bends freely with the tubing as the tubing vibrates and the vibrational movements of the tube are gradually lessened through the increasing support offered by the sleeve from its outer to its inner end.

2. A coupling for a flexible metal tube which is subjected to vibration, comprising: a tubular member to which the end of the tubing is to be attached, a sleeve slit so as to be contractable and having a resilient, externally tapered portion extending from said body member and gripping said tube, and means for contracting the sleeve about the tubing and for rigidly securing it to the body member, the tapered length of the sleeve extending along said tube externally of said contracting means and being of a length substantially one and one half or more times the external diameter of the tubing and tapering from a thickness approximately equal to the wall thickness of the tube to a thin outer edge of a thickness materially less than the wall thickness of the tube so that the thin edge of the sleeve bends freely with the tubing as the tubing vibrates and the vibrational movements of the tubing are gradually lessened through the increasing support offered by the sleeve from its outer end to its inner end.

3. A coupling for a flexible metal tube which is subjected to vibration, comprising: a tubular body member to which the end of the tubing is attached, a supporting sleeve having a split, resilient, externally tapered portion extending from said body member and gripping said tube, means for contracting the split portion of the sleeve about the tubing and rigidly securing said sleeve to the body member, and means sealing said tube to said body member inward of the contractable portion of said sleeve; said resilient portion of said sleeve extending along said tube externally of said contracting means and having a thin outer edge of a thickness materially less than the tubing thickness so that the thin edge of the sleeve bends freely with the tubing as the tubing vibrates and the vibrational movements of the tube are gradually lessened through the increasing support offered by the sleeve from its outer end inwardly to the base of the contractable portion.

4. A coupling for a flexible metal tube which is subject to vibration, comprising a tubular body member, means joining the tube to said body member, and a sleeve between the body member and the joining means, said sleeve comprising a body portion, a shoulder upon said body portion engaged by said joining means and cooperating therewith to press said tube into sealing engagement with said body member, and a plurality of resilient fingers contracted around said tube by said joining means and extending away from said joining means along said tube, said resilient fingers having flexible outer ends sufficiently thin to bend with the tubing as it vibrates.

5. A coupling for a flexible metal tube which is subject to vibration, comprising a tubular body member, means joining said tube to said body member, and a sleeve comprising a body portion interposed between said body member and said joining means, a shoulder on said body portion engaged by said joining means and co-operating therewith to press said tube into sealing engagement with said body member, and a plurality of resilient fingers contracted around said tube by said joining means and extending away from said joining means along said tube, said fingers being of gradually diminishing thickness as the distance from said joining means increases so that they offer gradually increasing resilient support to said tube from the outer ends of said fingers inwards.

6. Stress-distributing means for a member subject to vibration and comprising two contiguous portions of different relative stiffness, said stress-distributing means comprising a plurality of resilient fingers and means for clamping said fingers in position extending along the less stiff portion of said member with the inner ends of said fingers rigid with the stiffer portion of said member, said fingers pressing against said less stiff portion and being of gradually diminishing cross-sectional area from said inner ends outward whereby they offer gradually diminishing support for said less stiff portion of said member from their inner ends outward.

7. Stress-distributing means for a member subject to vibration and comprising two contiguous portions of different relative stiffness, said stress-distributing means comprising a plurality of resilient fingers and means for clamping said fingers in position extending along the less stiff portion of said member with the inner ends of said fingers rigid with the stiffer portion of said member, said fingers being of gradually diminishing cross-sectional area from said inner ends outward whereby they offer gradually diminishing support for said less stiff portion of said tube from their inner ends outward.

8. A stress-distributing sleeve for a tubing coupling, comprising a body portion adapted to press tubing into sealing engagement with a portion of said coupling when said coupling is tightened, and a plurality of resilient fingers contractable around said tubing by said coupling and extending along said tubing from said coupling, said fingers being of gradually diminishing cross-sectional area from said coupling toward their outer ends whereby they offer gradually diminishing resilient support to said member as the distance from said coupling increases.

ROBERT E. SNYDER.